May 29, 1962 E. R. ZIEGLER 3,036,847

WINDSHIELD WIPER ARM ATTACHMENT

Filed Sept. 28, 1959

INVENTOR.
Eugene R. Ziegler
BY
HIS ATTORNEY

United States Patent Office 3,036,847
Patented May 29, 1962

3,036,847
WINDSHIELD WIPER ARM ATTACHMENT
Eugene R. Ziegler, Spencerport, N.Y., assignor to General Motors Corporation, Detroit, Mich., a corporation of Delaware
Filed Sept. 28, 1959, Ser. No. 842,633
3 Claims. (Cl. 287—53)

This invention pertains to windshield wipers, and particularly to means for attaching a wiper arm to a wiper shaft in a manner permitting infinite angular adjustment of the arm relative to the shaft.

At the present time the majority of windshield wiper arms are connected to wiper shafts through mating serrated parts which permit adjustment of the arm relative to the shaft in increments of no less than 4°. The adjustment of a wiper arm relative to a wiper shaft in increments of 4° or more does not permit accurate positioning of the arms, particularly in a dual wiper installation, where it is desirable to have the wiper blades parked against the lower reveal molding, and have the inboard and outboard stroke end limits substantially the same. The present invention relates to an attachment assembly for drivingly interconnecting a wiper arm with a wiper shaft which, when released, permits infinite angular adjustment of the wiper arm relative to the wiper shaft. Accordingly, among my objects are the provision of improved means for attaching a wiper arm to a wiper shaft, the further provision of means for connecting a wiper arm to a wiper shaft permitting infinite angular adjustment therebetween; and the still further provision of a wiper arm to shaft connection including a multi-part clutch which can be frictionally locked to the wiper arm.

The aforementioned and other objects are accomplished in the present invention by tapering the mating surfaces of the multi-part clutch and the wiper arm such that the included angle is self-locking. Specifically, the wiper arm may be of any suitable type including spring hinge connected inner and outer sections. The inner arm section is formed with a frusto conical socket recess having a locking taper angle. The heat portion of the socket is apertured for receiving a captive nut having a suitable tool receiving head.

The wiper shaft is formed with a reduced diameter threaded end portion and a tapered axially serrated portion. A shoulder is formed between the threaded portion and the serrated portion. A multi-part clutch having internal serrations is assembled over the tapered serrated portion of the shaft, the parts of the clutch being held in assembled relation by a split ring. The outer periphery of the clutch members are likewise tapered at a locking angle the same as the frusto conical socket in the inner arm section. The clutch members are retained on the shaft by a washer which is press fitted onto the shoulder.

To attach a wiper arm to a wiper shaft, it is only necessary to position the socket portion of the inner arm section over the multi-part clutch, or clutch cluster, adjust the angular position of the arm to the desired position, and tighten the captive nut. The captive nut engages the threaded end of the shaft and the socket portion of the inner arm section whereupon the socket section is locked to the outer periphery of the clutch, and the clutch is drivingly connected to the shaft. By employing a locking taper angle between the outer periphery of the clutch cluster and the socket recess, only a minimum axial thrust between the captive nut and the threaded end of the shaft is required to securely lock the arm to the clutch cluster.

Further objects and advantages of the present invention will be apparent from the following description, reference being had to the accompanying drawing, wherein a preferred embodiment of the present invention is clearly shown.

Figure 1:
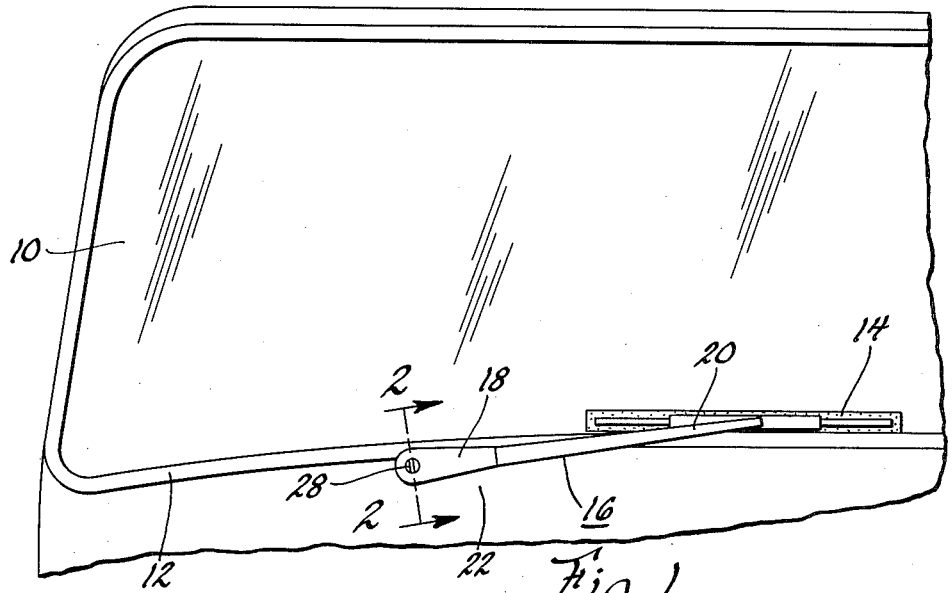
FIGURE 1 is a fragmentary view of a vehicle equipped with a windshield wiper having the attachment means of the present invention.

With particular reference to the drawing, FIGURE 1 depicts a portion of a vehicle having a windshield 10 with a lower reveal molding 12. The portion of the windshield shown is adapted to be wiped by a blade 14 carried by an arm 16 having spring hinge connected inner and outer sections 18 and 20. The inner arm section 18 is detachably connected to a pivot shaft, not shown in FIGURE 1, that projects through the cowl portion 22 of the vehicle. The pivot, or wiper, shaft may be oscillated by any suitable actuating mechanism well known in the art to impart oscillation to the wiper arm 16 and the blade 14 carried thereby throughout a wiping stroke, and when inactivated, move the wiper blade 14 to a depressed parked position against the lower reveal molding 12.

Figure 2:
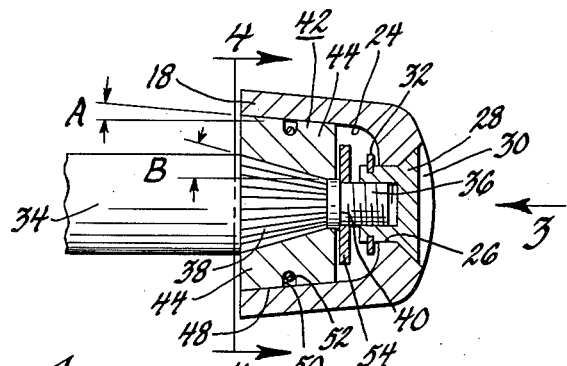
FIGURE 2 is an enlarged fragmentary view taken along line 2—2 of FIGURE 1.
Figure 4:
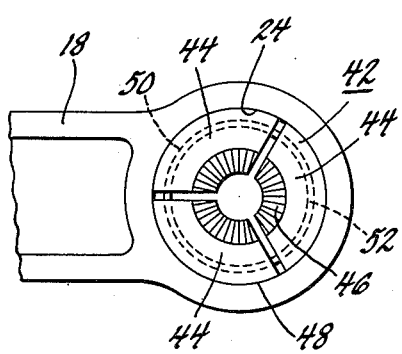
FIGURE 4 is a sectional view taken along line 4—4 of FIGURE 2 with the wiper shaft removed.
Figure 3:
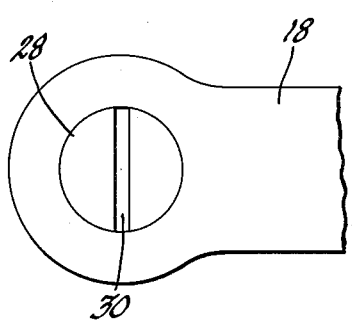
FIGURE 3 is a fragmentary view, in elevation, taken in the direction of arrow 3 of FIGURE 2.

Referring to FIGURES 2 through 4, the inner arm section 18, comprising a die casting, is formed with a frusto conical socket recess 24 having an opening 26 in the head portion thereof. The taper angle of the frusto conical socket recess 24 is a locking angle, that is below 7°, and in the specific embodiment is substantially 5°, this angle being indicated by A in FIGURE 2. The opening 26 in the head portion of the socket receives a captive nut 28 having a screw driver slot 30 in the head thereof. The nut 28 is retained in assembled relation with the socket of the inner arm section by a snap ring 32 which engages a groove adjacent the end thereof as shown in FIGURE 2.

The wiper arm 16 is adapted to be attached to a pivot shaft indicated by numeral 34. The pivot, or wiper, shaft 34 has a reduced diameter threaded end portion 36, an axially serrated tapered portion 38 and a shoulder 40 between the serrated portion 38 and the threaded end 36. The tapered section 38 has an included angle of substantially 15° as indicated by B, which, of course, is not a locking angle. A multi-part clutch member, or clutch cluster, 42 is mounted on the serrated portion 38 of the shaft 34. The clutch cluster 42 comprises three arcuate members 44 having serrations 46 on their inner peripheries and smooth outer peripheries 48. The angle of the serrated portions 46 is substantially equal to the angle of the serrations on the shaft 36, namely 15°, and the angle of the smooth outer portions 48 is substantially equal to the taper angle of the socket recess 24, namely substantially 5°. In addition, each clutch member 44 is formed with an arcuate groove 50 adapted to receive a split ring 52 for holding the clutch members in assembled relation with the pivot shaft 34. A washer 54 is press fitted onto the shaft in engagement with the shoulder 40 to prevent axial separation of the clutch cluster from the pivot shaft.

The wiper arm is shown securely locked to the shaft in FIGURE 2. In order to remove the wiper arm from the shaft, or to loosen the connection between the arm and the shaft to permit infinite angular adjustment of the arm relative to the shaft, the captive nut 28 is loosened. If the captive nut 28 is entirely disengaged from the threaded portion 36, the arm 16 can be removed from the shaft. However, it is not necessary to completely disengage the captive nut 28 and the threaded portion 36 of the shaft to permit angular adjustment of the arm to any desired position.

To securely lock the arm to the wiper shaft, the inner arm section 18 is placed over the clutch cluster 42 and the captive nut 28 is tightened onto the threaded end portion 36. Since the captive nut 28 engages the head portion of the socket, an axial thrust load is imposed on the screw, and the inner serrated periphery of the clutch member will wedgingly engage the serrated portion 36 of the shaft 34. In addition, the outer periphery 48 of the clutch members is securely locked within the socket recess 24 due to the self-locking taper angle A between the mating parts.

While the embodiment of the invention as herein disclosed constitutes a preferred form, it is to be understood that other forms might be adopted.

What is claimed is as follows:

1. In a windshield wiper, a shaft having an axially serrated portion and a threaded end, said shaft having a shoulder between said serrated portion and said threaded end, a multi-part clutch cluster engaging the serrated portion of said shaft and having an outer periphery with a self-locking taper angle, a washer press fitted onto said shaft in engagement with said shoulder for limiting axial movement of said clutch cluster in one direction, a wiper arm having an inner section adapted to be drivingly connected with the shaft, said inner arm section having a frusto conical socket recess with a self-locking taper angle adapted to frictionally engage the outer periphery of said clutch cluster, and a captive nut carried by said arm and engaging with the threaded end of said shaft for drivingly connecting the arm to the shaft.

2. In a windshield wiper, a shaft having an axially serrated tapered portion and a threaded end, said shaft having a shoulder between said serrated portion and said threaded end, a multi-part clutch cluster engaging the serrated portion of said shaft and having an outer periphery with a self-locking taper angle, a washer press fitted against said shoulder and engageable with said clutch cluster to limit axial movement thereof relative to said shaft in one direction, a wiper arm having an inner section adapted to be drivingly connected with the shaft, said inner section having a frusto conical socket recess with a self-locking taper angle adapted to frictionally engage the outer periphery of the clutch cluster, and a captive nut carried by said arm and engaging with the threaded end of said shaft for drivingly connecting the arm to the shaft.

3. In a windshield wiper, a shaft having an axially serrated portion and a threaded end, said shaft having a shoulder between said serrated portion and said threaded end, clutch means engaging the serrated portion of said shaft and having an outer periphery with a self-locking taper angle, a washer press fitted onto the shaft in engagement with said shoulder for limiting movement of said clutch means in one direction, a wiper arm having an inner section adapted to be drivingly connected with said shaft, said inner arm section having a frusto conical socket recess with a self-locking taper angle adapted to frictionally engage the outer periphery of said clutch means, and a nut carried by the inner section of said wiper arm and engaging the threaded end of said shaft for drivingly connecting the arm to the shaft.

References Cited in the file of this patent

UNITED STATES PATENTS

| | | |
|---|---|---|
| 2,657,083 | Krohm | Oct. 27, 1953 |
| 2,885,230 | Terpin | May 5, 1959 |

FOREIGN PATENTS

| | | |
|---|---|---|
| 497,366 | Great Britain | Dec. 19, 1938 |
| 1,118,850 | France | Mar. 26, 1956 |